(12) United States Patent
Iimura et al.

(10) Patent No.: US 12,485,947 B2
(45) Date of Patent: Dec. 2, 2025

(54) TRUCK

(71) Applicant: Honda Motor Co., Ltd., Tokyo (JP)

(72) Inventors: Taiki Iimura, Saitama (JP); Kazumasa Ozaki, Saitama (JP); Hiroshi Iwakami, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 383 days.

(21) Appl. No.: 18/187,640

(22) Filed: Mar. 21, 2023

(65) Prior Publication Data

US 2023/0303146 A1    Sep. 28, 2023

(30) Foreign Application Priority Data

Mar. 28, 2022    (JP) ................................. 2022-052008

(51) Int. Cl.
*B62B 5/00*    (2006.01)

(52) U.S. Cl.
CPC .......... *B62B 5/0073* (2013.01); *B62B 5/0043* (2013.01)

(58) Field of Classification Search
CPC ..... B62B 5/0073; B62B 5/0043; B62B 3/001; B62B 2301/02; B62B 5/0069; B60L 15/20; A61H 3/04
See application file for complete search history.

(56) References Cited

U.S. PATENT DOCUMENTS

| | | | |
|---|---|---|---|
| 2004/0030479 A1* | 2/2004 | Arndt | B60T 8/17551 701/41 |
| 2020/0262460 A1 | 8/2020 | Kim et al. | |
| 2022/0073078 A1 | 3/2022 | Kimura et al. | |

FOREIGN PATENT DOCUMENTS

| | | | |
|---|---|---|---|
| CN | 111531541 | 8/2020 | |
| CN | 112519865 | 3/2021 | |
| CN | 112519866 | 3/2021 | |
| CN | 113545581 | 10/2021 | |
| CN | 114152666 | 3/2022 | |
| CN | 115675590 A * | 2/2023 | ........... B62B 5/0033 |
| DE | 3623479 C2 * | 4/1992 | ............. B62D 7/159 |
| JP | 2003341519 | 12/2003 | |
| JP | 2004114800 | 4/2004 | |
| JP | 2012090914 | 5/2012 | |
| JP | 2014058250 | 4/2014 | |

(Continued)

OTHER PUBLICATIONS

"Office Action of Japan Counterpart Application", issued on Oct. 7, 2025, with English translation thereof, p. 1-p. 5.

*Primary Examiner* — Karen Beck
(74) *Attorney, Agent, or Firm* — JCIPRNET

(57) ABSTRACT

A truck includes a body, left and right wheels provided on the body, left and right drive units driving the wheels, a handle provided on the body, a sensor, and a control device. The sensor detects a front-rear load and a moment about a vertical axis applied to the handle. The control device sets a target front-rear velocity of the body based on the front-rear load, and sets a target angular velocity of the body about a vertical axis based on the moment about the vertical axis. In a case where a product of the target front-rear velocity and the target angular velocity is greater than a predetermined threshold, the control device performs correction processing on the target front-rear velocity so that the product is equal to or less than the threshold, and controls the drive units based on the corrected target front-rear velocity and the target angular velocity.

10 Claims, 11 Drawing Sheets

(56) References Cited

FOREIGN PATENT DOCUMENTS

KR     20180067467 X      6/2018
WO     WO-2004026617 A1 *     4/2004    ............. B60K 28/16

* cited by examiner

TRUCK

CROSS-REFERENCE TO RELATED APPLICATION

This application claims the priority benefit of Japan application serial no. 2022-052008, filed on Mar. 28, 2022. The entirety of the above-mentioned patent application is hereby incorporated by reference herein and made a part of this specification.

BACKGROUND

Technical Field

The disclosure relates to a truck.

Related Art

Patent Document 1 (Japanese Patent Application Laid-Open No. 2004-114800) discloses a power assist truck including a handle that detects a user's operating force, and a power assist control means that drives drive wheels for traveling and steering based on the operating force inputted to the handle.

In the truck disclosed in Patent Document 1, if the front-rear velocity or the angular velocity becomes too high during turning, the centrifugal force applied to the drive wheels increases, and there is a risk of slip of the drive wheels.

SUMMARY

An embodiment of the disclosure provides a truck (1) including a body (2), a pair of left and right wheels (3), left and right drive units (4), a handle (5), a sensor (6), and a control device (7). The pair of left and right wheels are provided on the body. The left and right drive units drive each of the wheels. The handle is provided on the body and receives a user's operation. The sensor detects a front-rear load and a moment about a vertical axis applied to the handle. The control device controls the drive units. The control device is configured to set a target front-rear velocity of the body based on the front-rear load, and set a target angular velocity of the body about a vertical axis based on the moment about the vertical axis. In a case where a product of the target front-rear velocity and the target angular velocity is greater than a predetermined threshold, the control device performs correction processing on the target front-rear velocity so that the product of the target front-rear velocity and the target angular velocity is equal to or less than the threshold, and controls the drive units based on the corrected target front-rear velocity and the target angular velocity.

An embodiment of the disclosure provides a truck (1) including a body (2), a pair of left and right wheels (3), left and right drive units (4), a handle (5), a sensor (6), and a control device (7). The pair of left and right wheels are provided on the body. The left and right drive units drive each of the wheels. The handle is provided on the body and receives a user's operation. The sensor detects a front-rear load and a moment about a vertical axis applied to the handle. The control device controls the drive units. The control device is configured to set a target front-rear velocity of the body based on the front-rear load, and set a target angular velocity of the body about a vertical axis based on the moment about the vertical axis. In a case where a product of the target front-rear velocity and the target angular velocity is greater than a predetermined threshold, the control device performs correction processing on the target angular velocity so that the product of the target front-rear velocity and the target angular velocity is equal to or less than the threshold, and controls the drive units based on the corrected target angular velocity and the target front-rear velocity.

An embodiment of the disclosure provides a truck (1) including a body (2), a pair of left and right wheels (3), left and right drive units (4), a handle (5), a sensor (6), and a control device (7). The pair of left and right wheels are provided on the body. The left and right drive units drive each of the wheels. The handle is provided on the body and receives a user's operation. The sensor detects a front-rear load and a moment about a vertical axis applied to the handle. The control device controls the drive units. The control device is configured to set a target front-rear velocity of the body based on the front-rear load, and set a target angular velocity of the body about a vertical axis based on the moment about the vertical axis. In a case where a product of the target front-rear velocity and the target angular velocity is greater than a predetermined threshold, the control device performs correction processing on the target front-rear velocity and the target angular velocity so that the product of the target front-rear velocity and the target angular velocity is equal to or less than the threshold, and controls the drive units based on the corrected target angular velocity and the corrected target front-rear velocity.

According to the above configuration, it is possible to provide a truck in which the wheels are less likely to slip and an appropriate turning motion can be performed.

DESCRIPTION OF THE EMBODIMENTS

Figure 1:
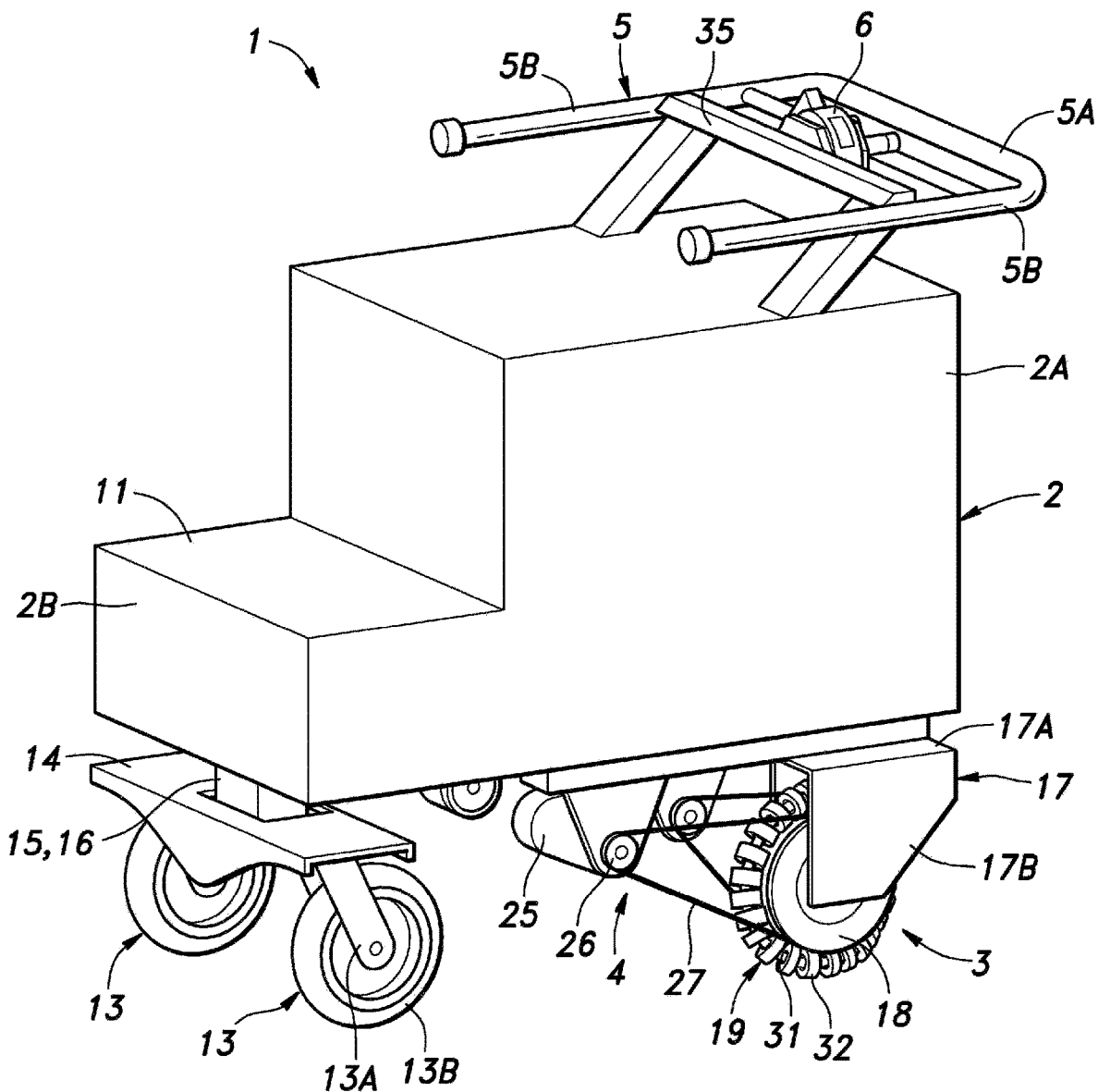
FIG. 1 is a perspective view of a truck according to the disclosure.

Embodiments of the disclosure provide a truck in which wheels are less likely to slip and an appropriate turning motion can be performed.

An embodiment of the disclosure provides a truck (1) including a body (2), a pair of left and right wheels (3), left and right drive units (4), a handle (5), a sensor (6), and a control device (7). The pair of left and right wheels are provided on the body. The left and right drive units drive each of the wheels. The handle is provided on the body and receives a user's operation. The sensor detects a front-rear load and a moment about a vertical axis applied to the handle. The control device controls the drive units. The control device is configured to set a target front-rear velocity of the body based on the front-rear load, and set a target angular velocity of the body about a vertical axis based on the moment about the vertical axis. In a case where a product of the target front-rear velocity and the target angular velocity is greater than a predetermined threshold, the control device performs correction processing on the target front-rear velocity so that the product of the target front-rear velocity and the target angular velocity is equal to or less than the threshold, and controls the drive units based on the corrected target front-rear velocity and the target angular velocity.

According to this embodiment, since the target front-rear velocity is corrected so that the product of the target front-rear velocity and the target angular velocity is equal to or less than the predetermined threshold, it is possible to provide a truck in which the wheels are less likely to slip and an appropriate turning motion can be performed.

An embodiment of the disclosure provides a truck (1) including a body (2), a pair of left and right wheels (3), left and right drive units (4), a handle (5), a sensor (6), and a control device (7). The pair of left and right wheels are provided on the body. The left and right drive units drive each of the wheels. The handle is provided on the body and receives a user's operation. The sensor detects a front-rear load and a moment about a vertical axis applied to the handle. The control device controls the drive units. The control device is configured to set a target front-rear velocity of the body based on the front-rear load, and set a target angular velocity of the body about a vertical axis based on the moment about the vertical axis. In a case where a product of the target front-rear velocity and the target angular velocity is greater than a predetermined threshold, the control device performs correction processing on the target angular velocity so that the product of the target front-rear velocity and the target angular velocity is equal to or less than the threshold, and controls the drive units based on the corrected target angular velocity and the target front-rear velocity.

According to this embodiment, since the target angular velocity is corrected so that the product of the target front-rear velocity and the target angular velocity is equal to or less than the predetermined threshold, it is possible to provide a truck in which the wheels are less likely to slip and an appropriate turning motion can be performed.

An embodiment of the disclosure provides a truck (1) including a body (2), a pair of left and right wheels (3), left and right drive units (4), a handle (5), a sensor (6), and a control device (7). The pair of left and right wheels are provided on the body. The left and right drive units drive each of the wheels. The handle is provided on the body and receives a user's operation. The sensor detects a front-rear load and a moment about a vertical axis applied to the handle. The control device controls the drive units. The control device is configured to set a target front-rear velocity of the body based on the front-rear load, and set a target angular velocity of the body about a vertical axis based on the moment about the vertical axis. In a case where a product of the target front-rear velocity and the target angular velocity is greater than a predetermined threshold, the control device performs correction processing on the target front-rear velocity and the target angular velocity so that the product of the target front-rear velocity and the target angular velocity is equal to or less than the threshold, and controls the drive units based on the corrected target angular velocity and the corrected target front-rear velocity.

According to this embodiment, since the target front-rear velocity and the target angular velocity are corrected so that the product of the target front-rear velocity and the target angular velocity is equal to or less than the predetermined threshold, it is possible to provide a truck in which the wheels are less likely to slip and an appropriate turning motion can be performed.

In the above embodiment, in a case where the threshold is Th, the target front-rear velocity is vt1, and the target angular velocity is ωt, the control device may perform correction by replacing the target front-rear velocity with a front-rear velocity correction value vt1' that satisfies Formula (1) below and replacing the target angular velocity with an angular velocity correction value of that satisfies Formula (2) below:

$$\begin{cases} vt1' = vt1\sqrt{\dfrac{Th}{vt1 \times \omega t}} & (1) \\ \omega t' = \omega t\sqrt{\dfrac{Th}{vt1 \times \omega t}} & (2) \end{cases}$$

According to this embodiment, the control device can easily correct the target front-rear velocity.

In the above embodiment, in a case where a mass of the truck is m, a distance in a vehicle front-rear direction from a center of gravity to the wheel is $L_1$, a distance in a vehicle width direction from the center of gravity to the wheel is $L_2$, a maximum static frictional force of the wheel with respect to a floor surface is $F_{max}$, and a propulsive force of each of the wheels with respect to the floor surface is F(i) (where i is an argument indicating a numeral of the wheel), the threshold may be set to be equal to or less than a minimum value of an upper limit value τ(i) represented by Formula (3):

$$\tau(i) = 2 \times \left(\dfrac{L_2}{L_1}\right) \times \dfrac{F_{max} - F(i)}{m}. \qquad (3)$$

According to this embodiment, the threshold can be set appropriately and easily.

In the above embodiment, the control device may perform the correction processing only when the truck moves backward.

According to this embodiment, the processing for controlling the truck performed by the control device is simplified.

According to the above configuration, it is possible to provide a truck in which the wheels are less likely to slip and an appropriate turning motion can be performed.

First Embodiment

Embodiments of a truck according to the disclosure will be described below with reference to the drawings. Hereinafter, each direction is defined with the truck as a reference.

As shown in FIG. 1, a truck 1 includes: a body 2; at least one omnidirectional wheel 3 provided on the body 2 and moving the body 2 in all directions along a floor surface; a drive unit 4 driving each omnidirectional wheel 3; a handle 5 provided on the body 2 and receiving a user's operation; a force sensor 6 detecting a load applied to the handle 5; and a control device 7 controlling the drive unit 4 based on the load detected by each force sensor 6.

The body 2 extends in a front-rear direction. A rear part 2A of the body 2 extends more upward than a front part 2B. The front part 2B of the body 2 is provided with a support stand 11 for supporting another device. Examples of the device supported by the support stand 11 include an inspection device such as an X-ray scanner. The device may be fastened to the support stand 11. The control device 7, a battery, and various sensors may be provided inside the rear part 2A of the body 2.

In this embodiment, a pair of omnidirectional wheels 3 are provided at a lower portion of the rear part 2A of the body 2. Left and right casters 13 are supported by a lower portion of the front part 2B of the body 2 via a suspension. The suspension includes: an arm 14 arranged below the body 2 and extending in a left-right direction; and a spring 15 and a shock absorber 16, arranged between the body 2 and the arm 14. The casters 13 are respectively arranged below left and right ends of the arm 14. Each caster 13 includes: a fork 13A coupled to the arm 14 rotatably about an axis extending in an up-down direction; and a wheel 13B supported by the fork 13A rotatably about an axis extending in a horizontal direction. The fork 13A rotates freely with respect to the arm 14, and the wheel 13B rotates freely with respect to the fork 13A.

Figure 2:
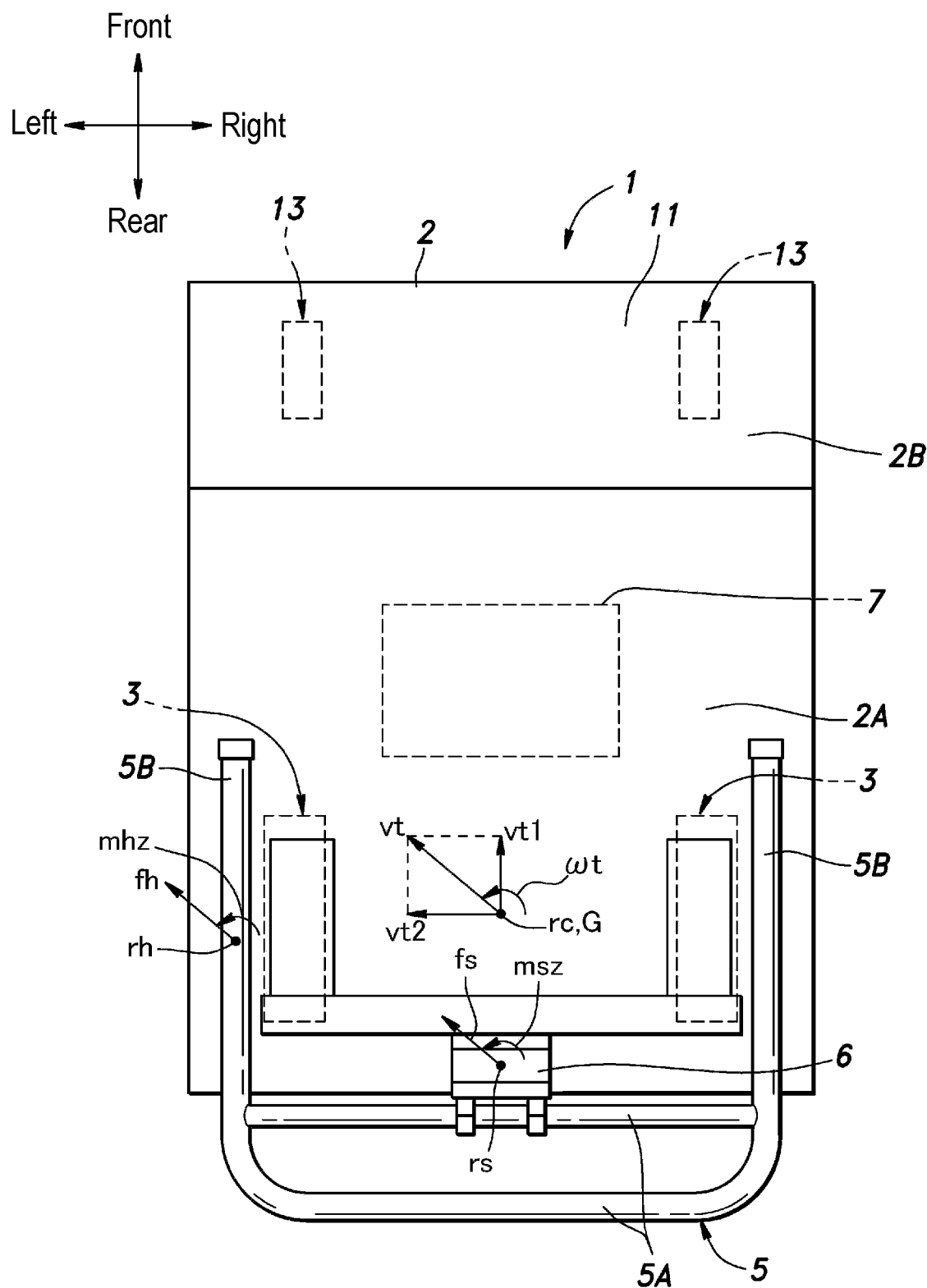
FIG. 2 is a plan view of the truck.
Figure 3:
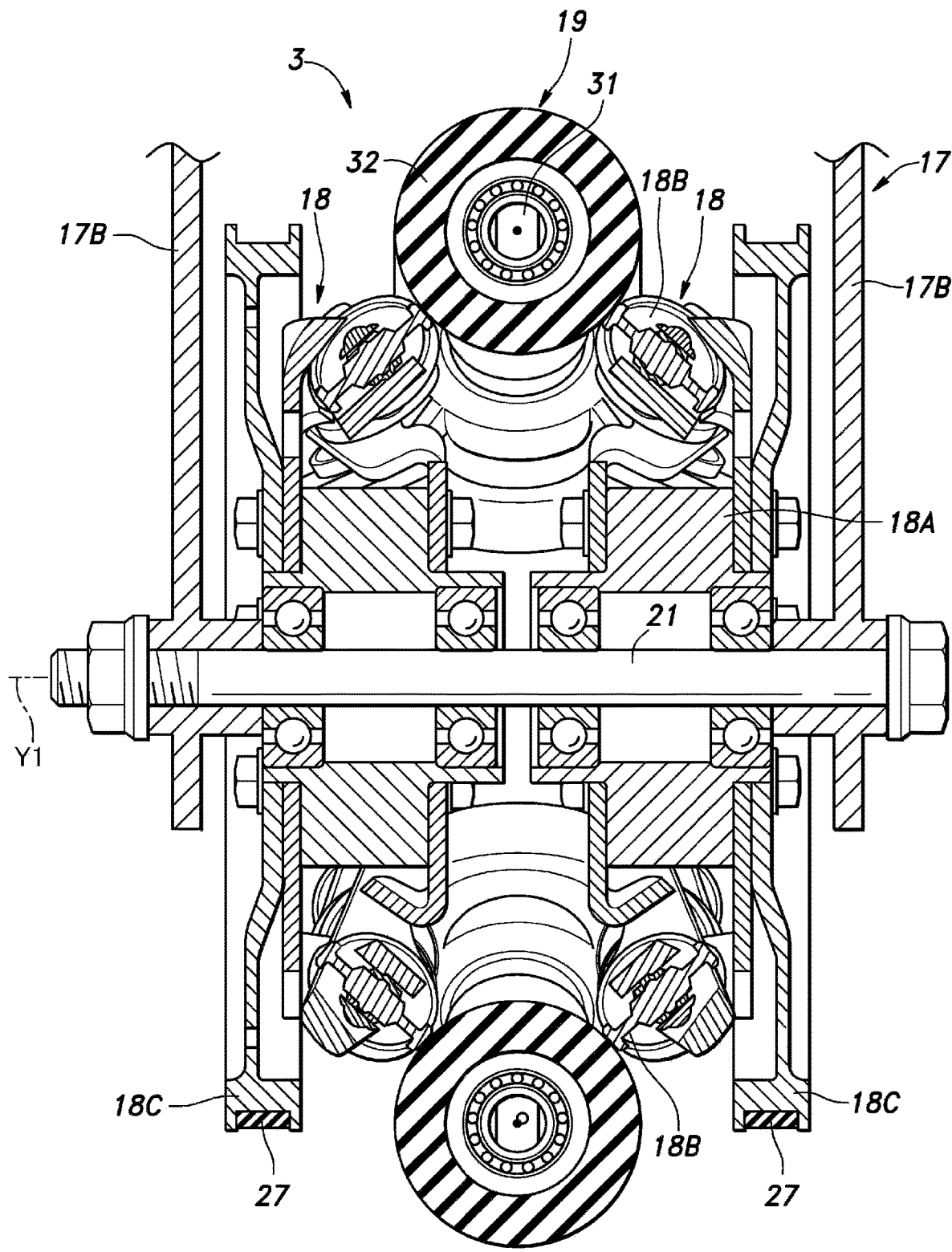
FIG. 3 is a cross-sectional view of an omnidirectional wheel 3.

As shown in FIG. 2, the pair of omnidirectional wheels 3 are arranged with an interval therebetween in the left-right direction. In this embodiment, the pair of omnidirectional wheels 3 are arranged at the lower left and lower right of the rear part 2A of the body 2. As shown in FIG. 3, each omnidirectional wheel 3 includes: a frame 17; a pair of drive discs 18 rotatably supported by the frame 17; and a main wheel 19 in an annular shape arranged between the pair of drive discs 18.

As shown in FIG. 1 and FIG. 3, the frame 17 has: a frame top 17A coupled to a lower part of the body 2; and a pair of frame sides 17B extending downward from left and right ends of the frame top 17A. A support shaft 21 extending in the left-right direction is extended across lower ends of the pair of frame sides 17B. The pair of drive discs 18 are rotatably supported by the support shaft 21. The pair of drive discs 18 rotate about an axis Y1 of the support shaft 21. A position of each drive disc 18 in the left-right direction with respect to the support shaft 21 is restricted. The drive discs 18 face each other with a distance therebetween in the left-right direction.

The drive disc 18 is arranged on both sides of the main wheel 19 in an annular shape, and applies a frictional force to the main wheel 19 to rotate the main wheel 19 about a central axis and about an annular axis. The drive disc 18 includes: a base 18A in a disc shape rotatably supported by the frame 17; and a plurality of drive rollers 18B rotatably supported to be inclined with respect to each other at an outer periphery of the base 18A and being in contact with the main wheel 19. The base 18A is arranged coaxially with the support shaft 21.

A driven pulley 18C is provided respectively on opposite surfaces of the drive discs 18. The driven pulley 18C is provided coaxially with the drive disc 18. The drive unit 4 is provided at a lower part of the body 2 and includes a plurality of electric motors 25 corresponding to the respective drive discs 18. In this embodiment, four electric motors 25 are provided corresponding to four drive discs 18. A drive pulley 26 is provided on an output shaft of each electric motor 25. The drive pulley 26 and the driven pulley 18C corresponding to each other are connected by a belt 27. With each electric motor 25 rotating independently of each other, each drive disc 18 rotates independently of each other.

Figure 4:
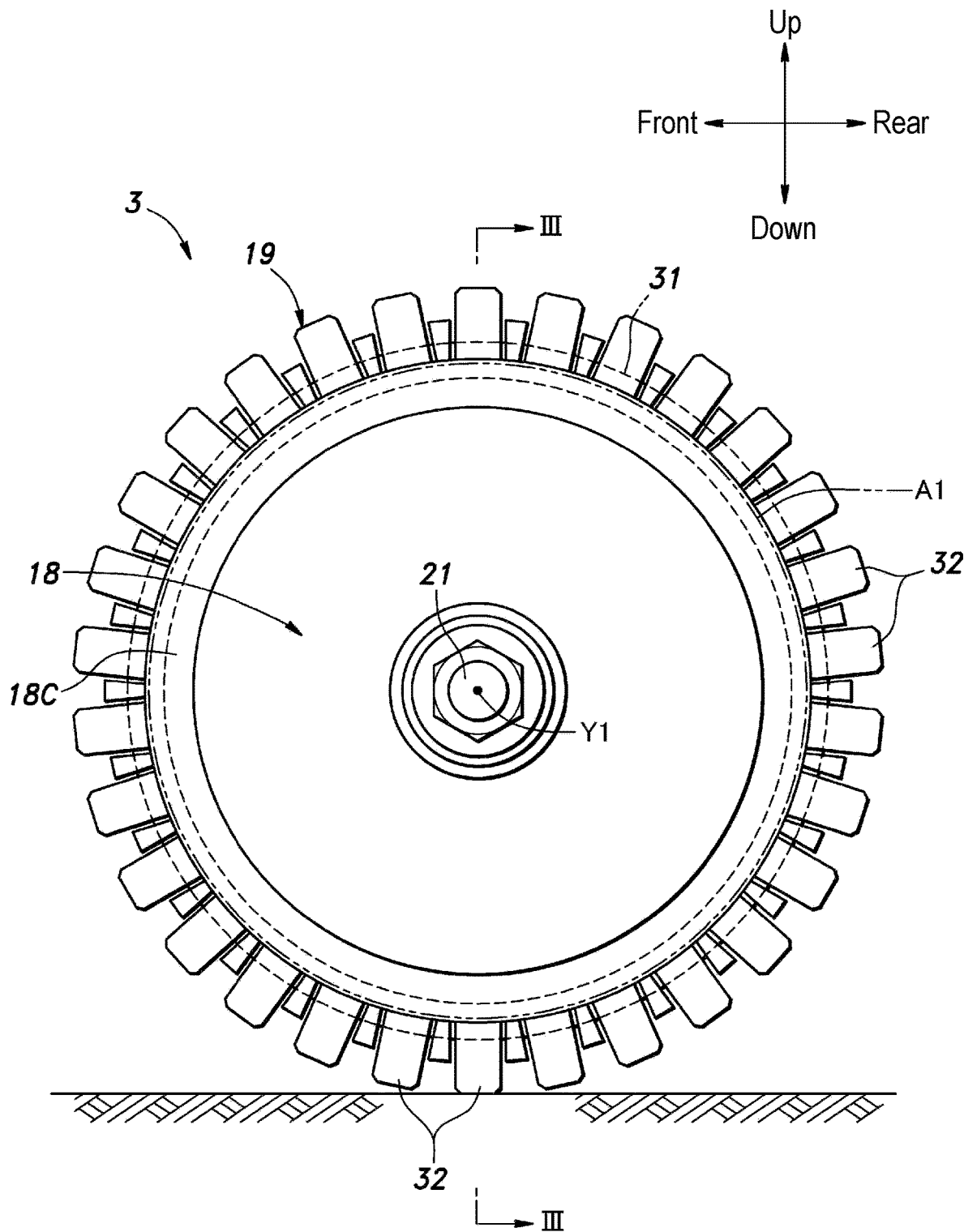
FIG. 4 is a side view of a main wheel.

As shown in FIG. 4, the main wheel 19 has an annular shape, is arranged between and coaxially with the pair of drive discs 18, is in contact with the plurality of drive rollers 18B, and is rotatable about the central axis and about the annular axis. The main wheel 19 includes a core body 31 in an annular shape and a plurality of driven rollers 32 rotatably supported by the core body 31. The plurality of driven rollers 32 are arranged at equal intervals in a circumferential direction of the core body 31. Each driven roller 32 is supported by the core body 31 rotatably about an axis A1 (annular axis) of the core body 31 in an annular shape. Each driven roller 32 is able to rotate at respective positions with respect to the core body 31 about a tangent of the core body 31. Each driven roller 32 rotates with respect to the core body 31 upon receiving an external force.

The main wheel 19 is arranged along an outer periphery of the pair of drive discs 18 and is in contact with the plurality of drive rollers 18B provided on each drive disc 18. The drive rollers 18B of each drive disc 18 are in contact with an inner periphery of the main wheel 19 and clamp the main wheel 19 from left and right sides. By contacting with the inner periphery of the main wheel 19, displacement of the drive rollers 18B of the left and right drive discs 18 in a radial direction about the axis Y1 of the drive disc 18 is restricted. Accordingly, the main wheel 19 is supported by the left and right drive discs 18, and the central axis of the main wheel 19 (core body 31) is arranged coaxially with the axis Y1 of the left and right drive discs 18. The main wheel 19 is in contact with the plurality of drive rollers 18B of the left and right drive discs 18 at the plurality of driven rollers 32.

In each omnidirectional wheel 3, if the pair of drive discs 18 rotate in the same direction at the same rotational speed, the main wheel 19 rotates together with the pair of drive discs 18. That is, the main wheel 19 rotates forward or rearward about its own rotation axis that coincides with the axis Y1. At this time, the drive rollers 18B of the drive disc 18 and the driven rollers 32 of the main wheel 19 do not rotate with respect to the core body 31. In each omnidirectional wheel 3, if a rotational speed difference occurs between the pair of drive discs 18, with respect to a force in the circumferential (tangential) direction due to rotation of the pair of drive discs 18, a force component in a direction orthogonal to this force acts on the driven rollers 32 of the main wheel 19 from the left and right drive rollers 18B. Since an axis of the drive roller 18B is inclined with respect to the circumferential direction of the drive roller 18B, the force component is generated between the drive discs 18 due to the rotational speed difference. By this force component, the drive roller 18B is rotated with respect to the base 18A and the driven roller 32 is rotated with respect to the core body 31. Accordingly, the main wheel 19 generates a propulsive force in the left-right direction.

With the left and right omnidirectional wheels 3 rotating forward at the same speed, the truck 1 moves forward. With the left and right omnidirectional wheels 3 rotating rearward at the same speed, the truck 1 moves backward. With occurrence of a speed difference in rotation of the left and right omnidirectional wheels 3 in the front-rear direction, the truck 1 turns to the right or to the left. By rotation of the driven rollers 32 of each main wheel 19 of the left and right omnidirectional wheels 3, the truck 1 translates to the right or to the left.

As shown in FIG. 1 and FIG. 2, at an upper portion of the rear part 2A of the body 2, a handle holder 35 is provided protruding upward. The handle 5 is supported by the handle holder via the force sensor 6. The force sensor 6 may be a three-axis force sensor that detects a load along two axes orthogonal to each other on a horizontal plane and a moment about a vertical axis (z-axis). In this embodiment, the force sensor 6 detects a front-rear load being a load applied to the handle 5 in the front-rear direction (x-axis), a left-right load being a load in the left-right direction (y-axis), and a moment about the vertical axis (z-axis). The force sensor 6 includes a main body and an input part provided on the main body. The main body is coupled to the handle holder 35.

The handle 5 includes: a lateral part 5A extending in the left-right direction; and a pair of longitudinal parts 5B extending forward from left and right ends of the lateral part 5A. A central portion of the lateral part 5A in the left-right direction is coupled to the input part of the force sensor 6.

As shown in FIG. 2, when a user applies an external force fh and a moment mhz at a position rh in the handle 5, the force sensor 6 detects a detected force fs and a detected moment msz at a sensor position rs. The detected force fs includes a front-rear load fs1 being a front-rear component and a left-right load fs2 being a left-right component.

The control device 7 is an electronic control unit (ECU) including processors such as a CPU, a non-volatile memory (ROM), and a volatile memory (RAM). The control device 7 controls the drive unit 4 by executing arithmetic processing in the processor in accordance with a program stored in the non-volatile memory. The control device 7 may be configured as one piece of hardware, or may be configured as a unit composed of a plurality of pieces of hardware. At least a portion of each functional part of the control device 7 may be realized by hardware such as large scale integration (LSI), an application specific integrated circuit (ASIC) or a field programmable gate array (FPGA), or may be realized by a combination of software and hardware.

Figure 5:
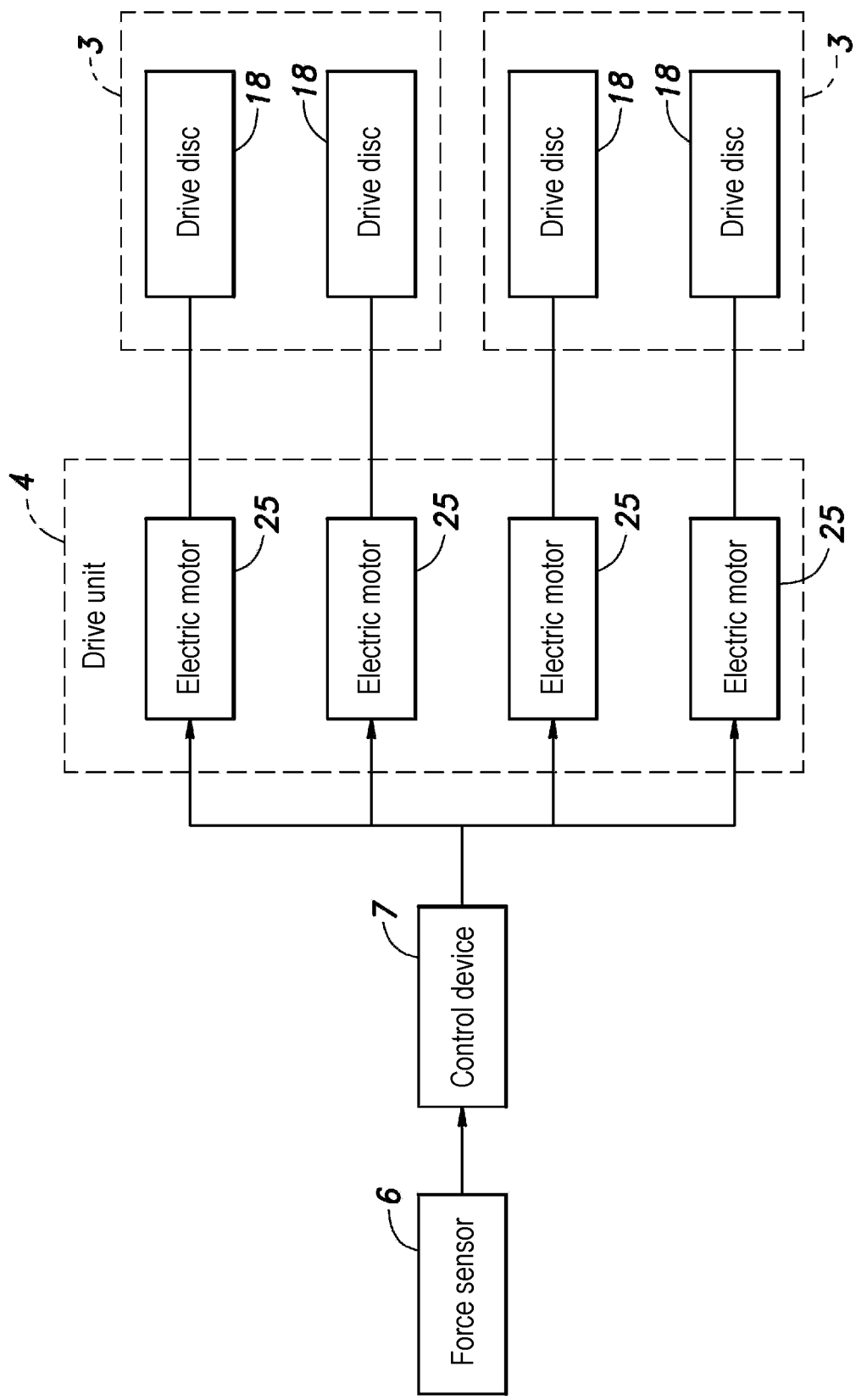
FIG. 5 is a block diagram showing a control device of the truck.

As shown in FIG. 5, the control device 7 is connected with the force sensor 6 and the drive unit 4. The force sensor 6 outputs a detection signal to the control device 7. The control device 7 outputs a control signal to the drive unit 4.

The control device 7 controls the drive unit 4 based on the signal from the force sensor 6. The force sensor 6 is interposed between the body 2 and the handle 5. The force sensor 6 detects a magnitude and a direction of an operating force (load) applied by the user to the handle 5. The control device 7 may determine a target front-rear velocity vt1, a target left-right velocity vt2, and a target angular velocity ωt of the truck 1 based on the signal from the force sensor 6, and may determine a control amount of each electric motor 25 of the drive unit 4 based on the target front-rear velocity vt1, the target left-right velocity vt2, and the target angular velocity ωt.

Figure 6:
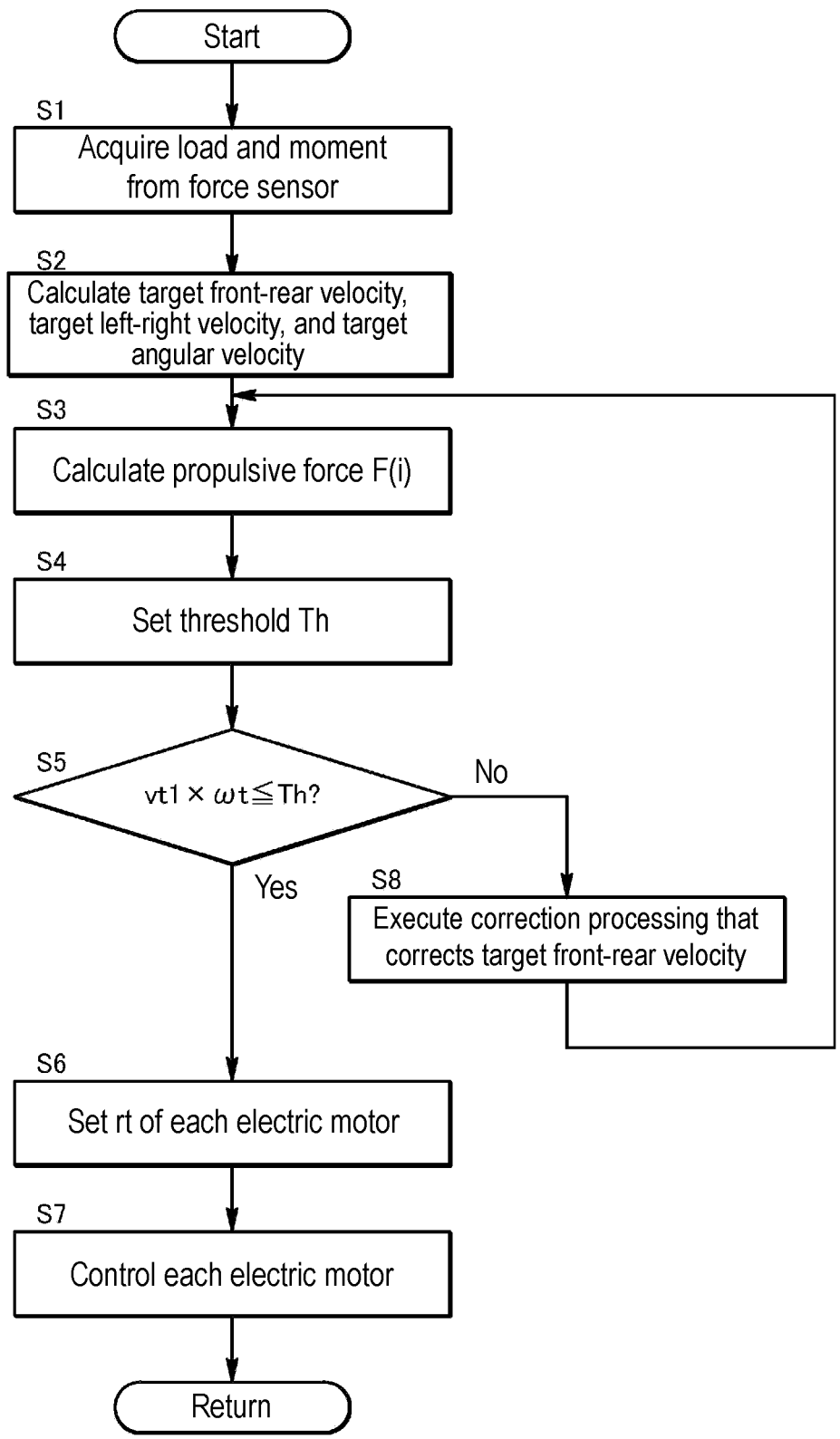
FIG. 6 is a flowchart showing a control procedure executed by the control device according to a first embodiment.

The control device 7 controls the drive unit 4 based on the flowchart shown in FIG. 6. First, based on a signal from the force sensor 6, the control device 7 acquires a detected force fs and a detected moment msz detected by the force sensor 6 (S1). The detected force fs includes a front-rear load fs1 and a left-right load fs2.

Next, the control device 7 sets the target front-rear velocity vt1 of the body 2 based on the front-rear load fs1, sets the target left-right velocity vt2 of the body 2 based on the left-right load fs2, and sets the target angular velocity ωt about a vertical axis of the body 2 based on the moment msz about a vertical axis (S2).

When the front-rear load fs1 is oriented forward, the control device 7 sets the target front-rear velocity vt1 to be oriented forward. In this embodiment, if the target front-rear velocity vt1 is oriented forward, that is, the truck 1 moves forward, the target front-rear velocity vt1 is set to be positive. In other words, if the target front-rear velocity vt1 is oriented rearward, that is, the truck 1 moves backward, the target front-rear velocity vt1 is set to be negative.

The target front-rear velocity vt1 may be set, for example, by multiplying the front-rear load fs1 by a predetermined coefficient k1. The target left-right velocity vt2 may be set, for example, by multiplying the left-right load fs2 by a predetermined coefficient k2. The target angular velocity ωt may be set, for example, by multiplying the moment msz about the vertical axis by a predetermined coefficient k3. The target angular velocity ωt is set about a reference point rc. The reference point rc may be set at a position that coincides with the center of gravity G of the truck 1 in plan view. In this embodiment, the reference point rc is arranged at a midpoint of a line segment connecting the pair of omnidirectional wheels 3. A method for setting the target front-rear velocity vt1, the target left-right velocity vt2, and the target angular velocity ωt is not limited to the above.

Herein, for simplicity of illustration, the left-right load fs2 applied by an operator that moves the truck 1 may be sufficiently small compared to the front-rear load fs1, or the coefficient k2 may be sufficiently small compared to the coefficients k1 and k3.

Next, the control device 7 calculates a propulsive force F(i) to be outputted by the left and right omnidirectional wheels 3 in order to respectively output the target front-rear velocity vt1 and the target angular velocity ωt (S3). Specifically, i of the propulsive force F(i) represents an argument (index) determined for each omnidirectional wheel 3, and for example, i may be determined to be 1 for the left omnidirectional wheel 3 and may be determined to be 2 for the right omnidirectional wheel 3.

Next, using the propulsive force F(i), the control device 7 calculates an upper limit value τ(i) defined for each omnidirectional wheel 3. The upper limit value τ(i) is represented by Formula (4) below.

$$\tau(i) = 2 \times \left(\frac{L_2}{L_1}\right) \times \frac{F_{max} - F(i)}{m} (i = 1, 2) \quad (4)$$

In Formula (4), $L_1$ represents a distance in the vehicle front-rear direction from the center of gravity G to the left and right omnidirectional wheels 3, $L_2$ represents a distance in the vehicle width direction (vehicle left-right direction) from the center of gravity G to the left and right omnidirectional wheels 3. $F_{max}$ indicates a maximum static frictional force of the left and right omnidirectional wheels 3 with respect to the floor surface.

Next, the control device 7 extracts a minimum value of the upper limit value τ(i) for i, and sets a predetermined value equal to or less than the minimum value as a threshold Th. In this embodiment, since there are two omnidirectional wheels 3, the control device 7 sets the threshold Th to satisfy Formula (5) below (S4).

$$Th \leq \min(\tau(1), \tau(2)) \quad (5)$$

In Formula (5), min(τ(1), τ(2)) represents a minimum value of τ(1) and τ(2). The control device 7 may set the threshold Th to the minimum value of the upper limit value τ(i) as in Formula (5), or may set the threshold Th to a value obtained by multiplying the minimum value of the upper limit value τ(i) by a predetermined positive constant less than one.

When the calculation of the threshold Th is completed, the control device 7 calculates a product of the target front-rear velocity vt1 and the target angular velocity ωt, and determines whether the product is equal to or less than the threshold Th, that is, determining whether Formula (6) is satisfied (S5).

$$vt \times \omega t \leq Th \tag{6}$$

When the product of the target front-rear velocity vt1 and the target angular velocity ωt is equal to or less than Th ("Yes" in S5), the control device 7 sets a target rotational speed rt for each electric motor 25 based on the target front-rear velocity vt1, the target left-right velocity vt2, and the target angular velocity ωt (S6).

When the setting of the target rotational speed rt of each electric motor 25 is completed, the control device 7 controls the electric current supplied to each electric motor 25 so that the rotational speed of each electric motor 25 becomes the target rotational speed, to thereby control each electric motor 25 (S7).

When the product of the target front-rear velocity vt1 and the target angular velocity ωt is not equal to or less than the threshold Th, that is, when the calculated product of the target front-rear velocity vt1 and the target angular velocity ωt is greater than the threshold Th ("No" in S5), the control device 7 performs correction processing that corrects the target front-rear velocity vt1 so that the product of the target front-rear velocity vt1 and the target angular velocity ωt is equal to or less than the threshold Th (S8).

In this embodiment, in the correction processing, the control device 7 acquires a correction value vt1' that satisfies Formula (7) below, and corrects the target front-rear velocity vt1 by setting the correction value vt1' as the target front-rear velocity vt1.

$$vt1' \leq Th/\omega t \tag{7}$$

The control device 7 may set the correction value vt1' to a value (i.e., the value on the right side of Formula (7)) obtained by dividing the threshold Th by the target angular velocity ωt, or may set the correction value vt1' to a value obtained by multiplying the value on the right side of Formula (7) by a predetermined positive constant less than one.

When the correction processing is completed (S8), using the corrected target front-rear velocity vt1 and the target angular velocity ωt, the control device 7 calculates the propulsive force F(i) for each omnidirectional wheel 3 (S3). Afterwards, the control device 7 calculates the threshold Th using Formulas (4) and (5) (S4), and determines whether the product of the corrected target front-rear velocity vt1 and the target angular velocity ωt is equal to or less than the threshold Th (S5). When the product of the corrected target front-rear velocity vt1 and the target angular velocity ωt is equal to or less than the threshold Th, the target rotational speed rt of each electric motor 25 is set (S6), and control on the electric motor 25 is performed (S7). When the product of the corrected target front-rear velocity vt1 and the target angular velocity ωt is greater than the threshold Th, the correction processing is executed again (S8).

Next, the effects of the truck 1 configured in this manner will be described.

When the left-right load fs2 applied by the operator who moves the truck 1 is sufficiently small compared to the front-rear load fs1 (or when the coefficient k2 is sufficiently small compared to the coefficients k1 and k3), the truck 1 turns while making a circular motion at an angular velocity of the target angular velocity ωt. At that time, a centrifugal force F applied to the truck 1 is represented as F=m×vt1×ωt.

Figure 7:
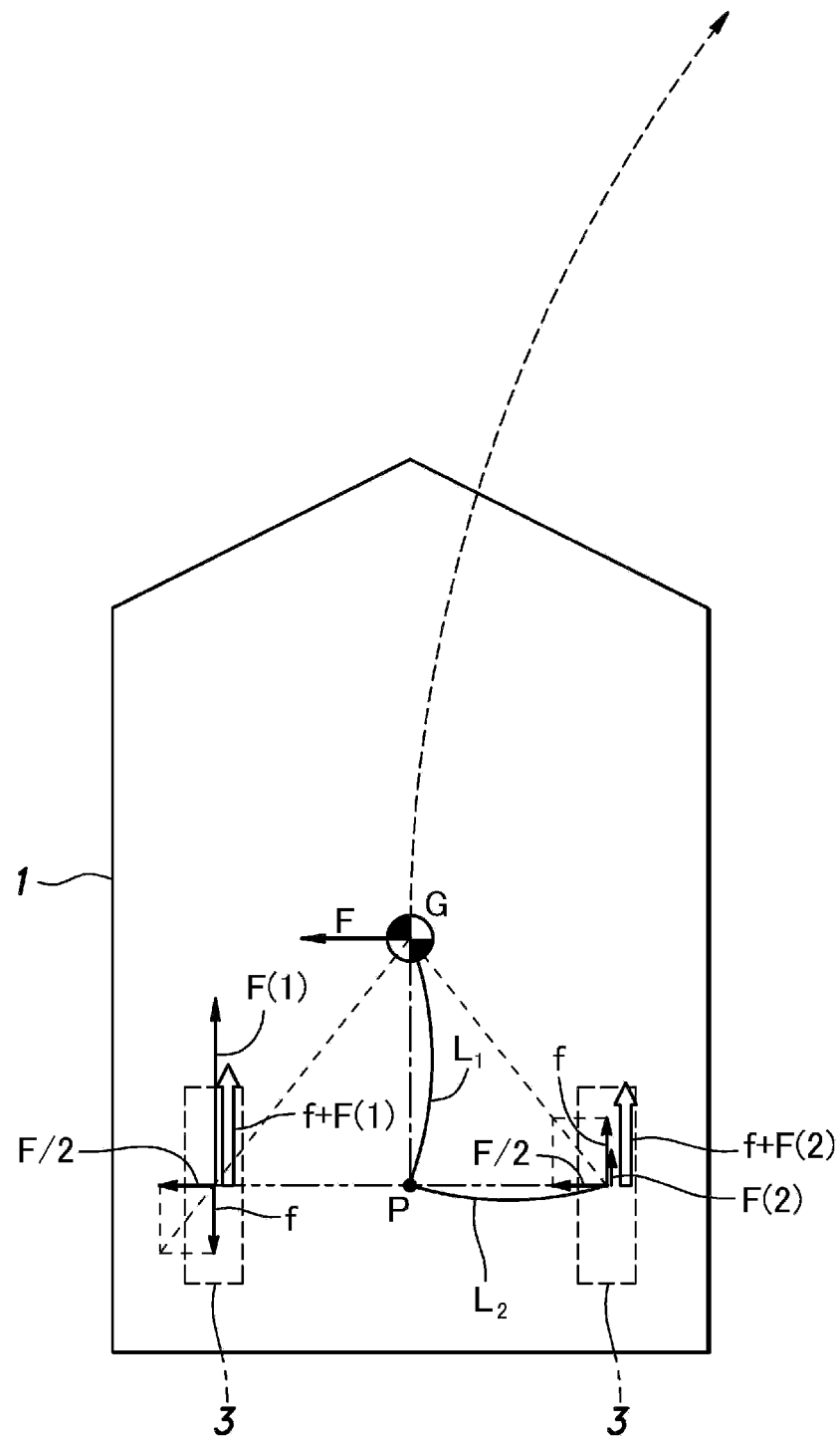
FIG. 7 is a schematic view showing a propulsive force of the omnidirectional wheel 3, a centrifugal force of the truck, and a couple when the truck moves forward.

As shown in FIG. 7, the centrifugal force F applied to the truck 1 is distributed to each of the omnidirectional wheels 3, and a load of F/2 oriented outward in the turning direction is applied to each of the omnidirectional wheels 3. Further, to prevent rotation of the truck 1 about the center of gravity G due to this load, a couple f is generated on each of the omnidirectional wheels 3. This couple f acts so that a sum of a resultant force with F/2 is oriented in the direction of the center of gravity G of the truck 1.

Based on the condition of acting so that the sum of the resultant force with F/2 is oriented in the direction of the center of gravity G of the truck 1, the couple f satisfies Formula (8) below.

$$(F/2) \times L1 = f \times L_2 \tag{8}$$

In the omnidirectional wheel 3 positioned on the side close to the turning center side, the couple f acts forward in both the case where the truck 1 moves forward and the case where the truck 1 moves backward (see FIG. 7). On the other hand, in the omnidirectional wheel 3 positioned on the side far from the turning center side, the couple f acts rearward in both the case where the truck 1 moves forward and the case where the truck 1 moves backward (also see FIG. 11).

The couple f and the propulsive force F(i) act on the omnidirectional wheels 3 in the turning direction. Therefore, when the sum of the couple f and the propulsive force F(i) is equal to or less than the maximum static frictional force $F_{max}$, that is, when Formula (9) is satisfied, slip of each omnidirectional wheel 3 in the turning direction can be reduced.

$$F(i)+f \leq F_{max} \ (i=1,2) \tag{9}$$

By combining the formula F=m×vt1×ωt for the centrifugal force F, Formula (8), and Formula (9), Formula (10) below associated with vt1×ωt is obtained.

$$vt1 \times \omega t \leq 2 \times \left(\frac{L_2}{L_1}\right) \times \frac{F_{max} - F(i)}{m} (i = 1, 2) \tag{10}$$

That is, when each omnidirectional wheel 3 satisfies Formula (10), each omnidirectional wheel 3 is less likely to slip in the turning direction. Therefore, it is possible to provide a truck 1 capable of performing an appropriate turning motion.

Further, the threshold Th in Formula (5) corresponds to the minimum value on the right side of Formula (10). Therefore, by using Formulas (4) and (5), it is possible to appropriately and easily set the threshold Th which indicates the upper limit of the product of the target front-rear velocity and the target angular velocity for preventing slip of the omnidirectional wheels 3 in the turning direction.

In this embodiment, when the product of the target front-rear velocity vt1 and the target angular velocity ωt is equal to or less than the threshold Th ("Yes" in S5), the control device 7 controls the omnidirectional wheel 3 so that the front-rear velocity becomes the target front-rear velocity vt1 and the angular velocity becomes the target angular velocity ωt. As shown in Formula (5), since the threshold Th is set to be equal to or less than the minimum value of Formula (10), the product of the target front-rear velocity vt1 and the target angular velocity ωt is set to satisfy Formula (10). Accordingly, the omnidirectional wheels 3 are less likely to slip.

Further, when the product of the target front-rear velocity vt1 and the target angular velocity ωt is greater than the threshold Th ("No" in S5), the control device 7 corrects the target front-rear velocity vt1 until the product of the target front-rear velocity vt1 and the target angular velocity ωt becomes equal to or less than the threshold Th (S8). Therefore, since the product of the front-rear velocity and the angular velocity to be outputted satisfies Formula (7), the omnidirectional wheels 3 are less likely to slip.

Further, in the correction processing, the control device 7 can easily acquire the correction value vt1' by calculating the right side of Formula (7). Therefore, the control device 7 can easily correct the target front-rear velocity vt1.

Second Embodiment

In a truck 1 according to a second embodiment, the correction processing performed by the control device 7 when the product of the target front-rear velocity vt1 and the target angular velocity ωt is greater than the threshold Th ("No" in S5) is different from that of the first embodiment, and the rest of the configuration is the same as that of the first embodiment and descriptions thereof will be omitted.

Figure 8:
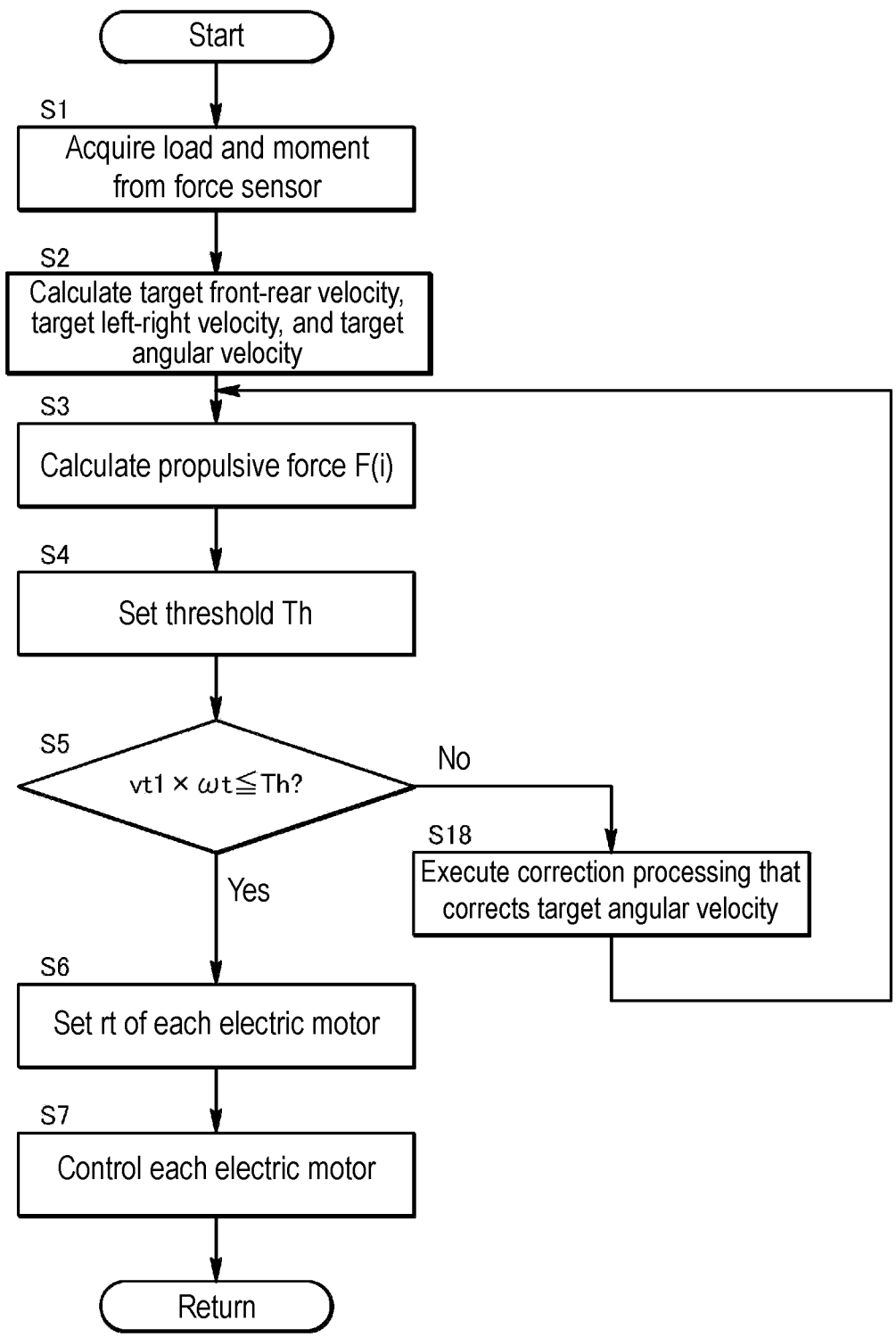
FIG. 8 is a flowchart showing a control procedure executed by the control device according to a second embodiment.

As shown in FIG. 8, in the second embodiment, when the product of the target front-rear velocity vt1 and the target angular velocity ωt is greater than the threshold Th ("No" in S5), the control device 7 performs correction processing that corrects the target angular velocity ωt so that the product of the target angular velocity ωt and the target front-rear velocity vt1 is equal to or less than the threshold Th (S18).

In this embodiment, in the correction processing, the control device 7 acquires a correction value ωt' that satisfies Formula (11) below, and corrects the target angular velocity ωt by setting the correction value ωt' as the target angular velocity ωt.

$$wt' \leq Th/vt \quad (11)$$

The control device 7 may set the correction value ωt' to a value (i.e., the value on the right side of Formula (11)) obtained by dividing the threshold Th by the target front-rear velocity vt1, or may set the correction value ωt' to a value obtained by multiplying the value on the right side of Formula (11) by a predetermined positive constant less than one.

When the correction processing is completed (S18), using the target front-rear velocity vt1 and the corrected target angular velocity ωt, the control device 7 calculates the propulsive force F(i) for each omnidirectional wheel 3 (S3). Afterwards, the control device 7 calculates the threshold Th using Formulas (4) and (5) (S4), and determines whether the product of the target front-rear velocity vt1 and the corrected target angular velocity ωt is equal to or less than the threshold Th (S5). When the product of the target front-rear velocity vt1 and the corrected target angular velocity ωt is equal to or less than the threshold Th, the target rotational speed rt of each electric motor 25 is set (S6), and control on the electric motor 25 is performed (S7). When the product of the target front-rear velocity vt1 and the corrected target angular velocity ωt is greater than the threshold Th, the correction processing is executed again (S18).

Next, the effects of the truck 1 configured in this manner will be described. When the product of the target front-rear velocity vt1 and the target angular velocity ωt is greater than the threshold Th ("No" in S5), the control device 7 corrects the target angular velocity ωt until the product of the target angular velocity ωt and the target front-rear velocity vt1 becomes equal to or less than the threshold Th (S18). Therefore, since the product of the front-rear velocity and the angular velocity to be outputted satisfies Formula (10), the omnidirectional wheels 3 of the truck 1 are less likely to slip. Therefore, it is possible to provide a truck capable of performing an appropriate turning motion.

Further, in the correction processing, the control device 7 can easily acquire the correction value ωt' by calculating the right side of Formula (11). Therefore, the control device 7 can easily correct the target angular velocity ωt.

Third Embodiment

In a truck 1 according to a third embodiment, the correction processing performed by the control device 7 when the product of the target front-rear velocity vt1 and the target angular velocity ωt is greater than the threshold Th ("No" in S5) is different, and the rest of the configuration is the same as that of the first embodiment and descriptions thereof will be omitted.

Figure 9:
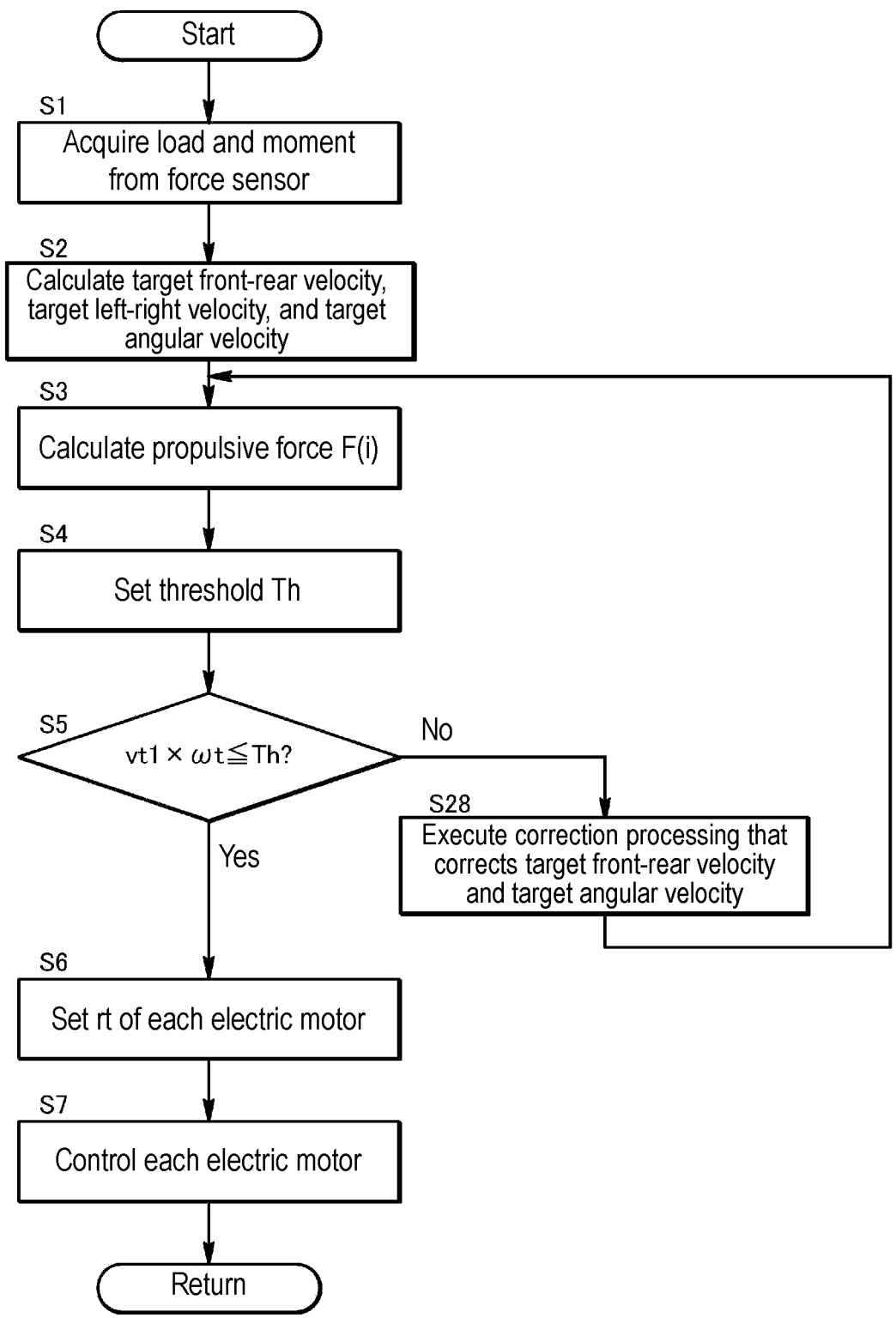
FIG. 9 is a flowchart showing a control procedure executed by the control device according to a third embodiment.

As shown in FIG. 9, in the third embodiment, when the product of the target front-rear velocity vt1 and the target angular velocity ωt is greater than the threshold Th ("No" in S5), the control device 7 performs correction processing that respectively corrects the target angular velocity ωt and the target front-rear velocity vt1 so that the product of the target angular velocity ωt and the target front-rear velocity vt1 is equal to or less than the threshold Th (S28).

In this embodiment, in the correction processing, the control device 7 acquires a front-rear velocity correction value vt1' and an angular velocity correction value ωt' that satisfy Formulas (12) and (13) below. Afterwards, the control device 7 corrects the target front-rear velocity vt1 by replacing the target front-rear velocity vt1 with the front-rear velocity correction value vt1', and corrects the target angular velocity ωt by replacing the target angular velocity ωt with the angular velocity correction value ωt'.

$$\begin{cases} vt1' \leq vt1\sqrt{\dfrac{Th}{vt1 \times \omega t}} & (12) \\ \omega t' \leq \omega t\sqrt{\dfrac{Th}{vt1 \times \omega t}} & (13) \end{cases}$$

The control device 7 may set the front-rear velocity correction value vt1' to the value on the right side of Formula (12), or to a value obtained by multiplying the value on the right side of Formula (12) by a predetermined positive constant less than 1. The control device 7 may set the angular velocity correction value of to the value on the right side of Formula (13), or to a value obtained by multiplying the value on the right side of Formula (13) by a predetermined positive constant less than 1.

When the correction processing is completed (S28), the control device 7 calculates the propulsive force F(i) for each omnidirectional wheel 3 using the corrected target front-rear velocity vt1 and the corrected target angular velocity ωt (S3). Afterwards, the control device 7 calculates the threshold Th using Formulas (4) and (5) (S4), and determines whether the product of the corrected target front-rear velocity vt1 and the corrected target angular velocity ωt is equal to or less than the threshold Th (S5). When the product of the corrected target front-rear velocity vt1 and the corrected target angular velocity ωt is equal to or less than the threshold Th, the target rotational speed rt of each electric motor 25 is set (S6), and control on the electric motor 25 is performed (S7). When the product of the corrected target front-rear velocity vt1 and the corrected target angular velocity ωt is greater than the threshold Th, the correction processing is executed again (S28).

Next, the effects of the truck 1 configured in this manner will be described. When the product of the target front-rear velocity vt1 and the target angular velocity ωt is greater than the threshold Th ("No" in S5), the control device 7 corrects the target front-rear velocity vt1 and the target angular velocity ωt until the product of the target front-rear velocity vt1 and the target angular velocity ωt becomes equal to or less than the threshold Th (S28). Therefore, since the product of the front-rear velocity and the angular velocity to be outputted satisfies Formula (10), the omnidirectional wheels 3 of the truck 1 are less likely to slip. Therefore, it is possible to provide a truck capable of performing an appropriate turning motion.

Further, in the correction processing, the control device 7 can easily acquire the front-rear velocity correction value vt1' and the angular velocity correction value ωt' by calculating the right sides of Formulas (12) and (13). Therefore, the control device 7 can easily correct the target front-rear velocity vt1 and the target angular velocity ωt.

Modification Examples

As a modification example of the first to third embodiments above, the control device 7 may be configured to perform correction processing only when the truck 1 moves backward, that is, only when the target front-rear velocity is negative.

Figure 10:
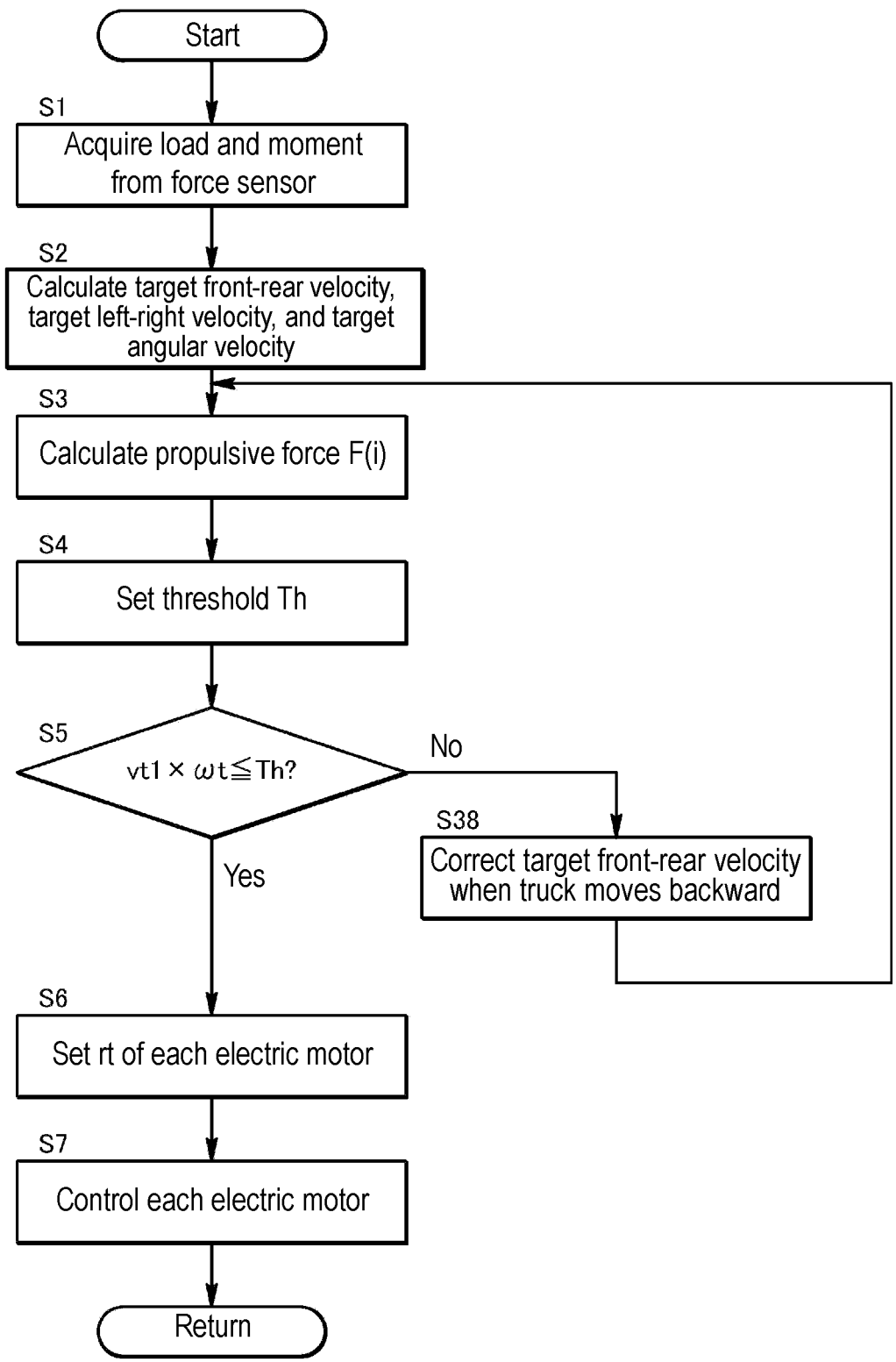
FIG. 10 is a flowchart showing a modification example of a control procedure executed by the control device according to the first embodiment.

FIG. 10 illustrates a flowchart in a modification example of the first embodiment. The control device 7 corrects the target front-rear velocity vt1 only when the target front-rear velocity is negative (S38).

Next, the effects of the modification example configured in this manner will be described.

Generally, the omnidirectional wheel 3 positioned on the side far from the turning center is required to output a larger propulsive force F(i) than on the side close to the turning center.

On the other hand, the couple f always acts forward in the omnidirectional wheel 3 positioned on the side close to the turning center side, and the couple f always acts rearward in the omnidirectional wheel 3 positioned on the side far from the turning center side.

When the truck 1 moves forward, the omnidirectional wheels 3 each output a propulsive force F(i) forward, as shown in FIG. 7. Therefore, when the truck 1 moves forward, the directions of the propulsive force F(i) and the couple f are opposite to each other in the omnidirectional wheel 3 positioned on the side far from the turning center.

Figure 11:
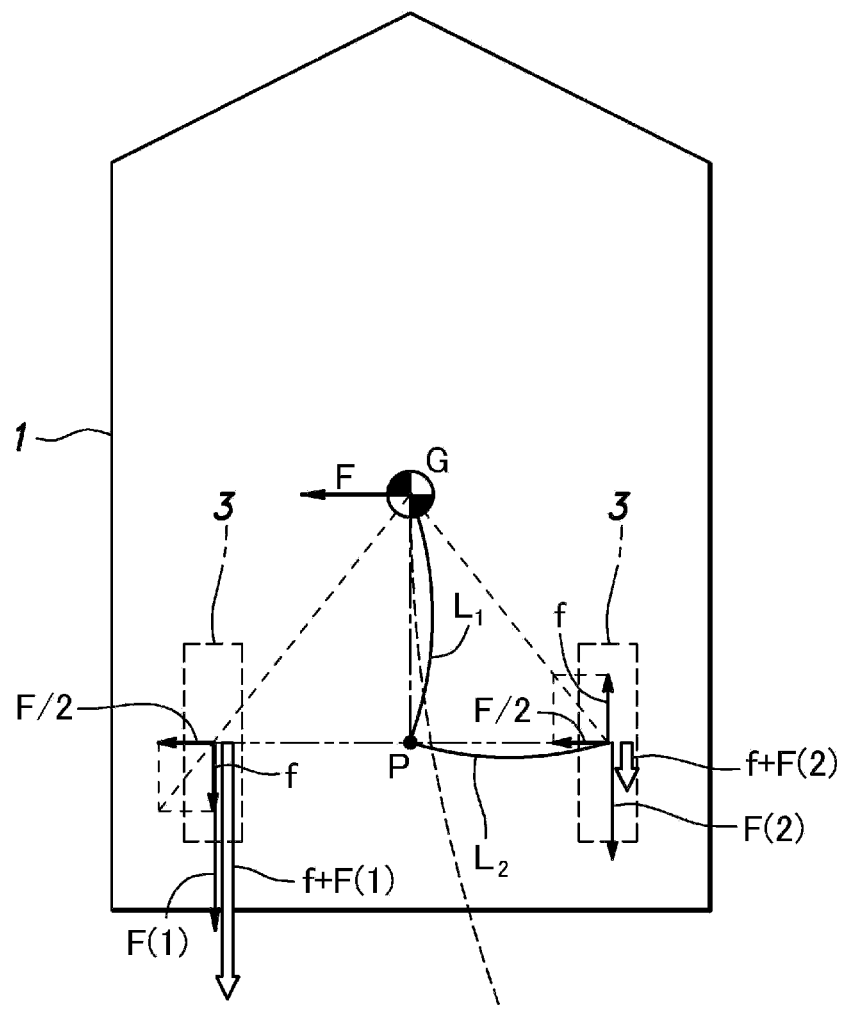
FIG. 11 is a schematic view showing a propulsive force of the omnidirectional wheel 3, a centrifugal force of the truck, and a couple when the truck moves backward.

When the truck 1 moves backward, the omnidirectional wheels 3 each output a propulsive force F(i) rearward, as shown in FIG. 11. Therefore, when the truck 1 moves backward, the propulsive force F(i) and the couple f are oriented in the same direction (rearward) in the omnidirectional wheel 3 positioned on the side far from the turning center, so slip is likely to occur in the omnidirectional wheel 3 positioned on the side far from the turning center.

By performing the correction processing only when the target front-rear velocity is negative, that is, when the truck 1 moves backward, it is possible to reduce slip of the omnidirectional wheel 3 especially when the omnidirectional wheels move backward, that is, when the omnidirectional wheels 3 are likely to slip, and since the processing to be performed by the control device 7 is reduced, the processing for controlling the truck 1 performed by the control device 7 is simplified.

Although specific embodiments have been described above, the disclosure is not limited to the above embodiments and may be extensively modified.

In another embodiment, instead of the force sensor 6, a sensor that is able to detect a front-rear load, a left-right load, and a moment about a vertical axis applied to the handle 5 may be used. For example, the sensor may be configured by combining a plurality of independent load sensors.

In the above embodiments, the truck 1 is provided with the omnidirectional wheels 3, but the disclosure is not limited to this form. Instead of the omnidirectional wheels 3, as long as the truck 1 is provided with a pair of left and right wheels that can be driven based on the target front-rear velocity and the target angular velocity, any form of the wheels may be adopted.

What is claimed is:

1. A truck comprising:
a body;
a pair of left and right wheels provided on the body;
left and right drive units which drive each of the wheels;
a handle which is provided on the body and receives a user's operation;
a sensor which detects a front-rear load and a moment about a vertical axis applied to the handle; and
a control device which controls the drive units, wherein the control device is configured to:
set a target front-rear velocity of the body based on the front-rear load, and
set a target angular velocity of the body about a vertical axis based on the moment about the vertical axis, and
in a case where a product of the target front-rear velocity and the target angular velocity is greater than a predetermined threshold, the control device performs correction processing on the target front-rear velocity so that the product of the target front-rear velocity and the target angular velocity is equal to or less than the threshold, and controls the drive units based on a corrected target front-rear velocity and the target angular velocity.

2. The truck according to claim 1, wherein
in a case where a mass of the truck is m, a distance in a vehicle front-rear direction from a center of gravity to the wheel is $L_1$, a distance in a vehicle width direction from the center of gravity to the wheel is $L_2$, a maximum static frictional force of the wheel with respect to a floor surface is $F_{max}$, and a propulsive force of each of the wheels with respect to the floor surface is F(i), i being an argument indicating a numeral of the wheel, the threshold is set to be equal to or less than a minimum value of an upper limit value τ(i) represented by Formula (3):

$$\tau(i) = 2 \times \left(\frac{L_2}{L_1}\right) \times \frac{F_{max} - F(i)}{m}. \quad (3)$$

3. The truck according to claim 1, wherein the control device performs the correction processing only when the truck moves backward.

4. A truck comprising:
a body;

a pair of left and right wheels provided on the body;
left and right drive units which drive each of the wheels;
a handle which is provided on the body and receives a user's operation;
a sensor which detects a front-rear load and a moment about a vertical axis applied to the handle; and
a control device which controls the drive units, wherein the control device is configured to:
set a target front-rear velocity of the body based on the front-rear load, and
set a target angular velocity of the body about a vertical axis based on the moment about the vertical axis, and
in a case where a product of the target front-rear velocity and the target angular velocity is greater than a predetermined threshold, the control device performs correction processing on the target angular velocity so that the product of the target front-rear velocity and the target angular velocity is equal to or less than the threshold, and controls the drive units based on the corrected target angular velocity and the target front-rear velocity.

5. The truck according to claim 4, wherein
in a case where a mass of the truck is m, a distance in a vehicle front-rear direction from a center of gravity to the wheel is $L_1$, a distance in a vehicle width direction from the center of gravity to the wheel is $L_2$, a maximum static frictional force of the wheel with respect to a floor surface is $F_{max}$, and a propulsive force of each of the wheels with respect to the floor surface is F(i), i being an argument indicating a numeral of the wheel, the threshold is set to be equal to or less than a minimum value of an upper limit value τ(i) represented by Formula (3):

$$\tau(i) = 2 \times \left(\frac{L_2}{L_1}\right) \times \frac{F_{max} - F(i)}{m}. \quad (3)$$

6. The truck according to claim 4, wherein the control device performs the correction processing only when the truck moves backward.

7. A truck comprising:
a body;
a pair of left and right wheels provided on the body;
left and right drive units which drive each of the wheels;
a handle which is provided on the body and receives a user's operation;
a sensor which detects a front-rear load and a moment about a vertical axis applied to the handle; and
a control device which controls the drive units, wherein the control device is configured to:
set a target front-rear velocity of the body based on the front-rear load, and
set a target angular velocity of the body about a vertical axis based on the moment about the vertical axis, and
in a case where a product of the target front-rear velocity and the target angular velocity is greater than a predetermined threshold, the control device performs correction processing on the target front-rear velocity and the target angular velocity so that the product of the target front-rear velocity and the target angular velocity is equal to or less than the threshold, and controls the drive units based on a corrected target angular velocity and a corrected target front-rear velocity.

8. The truck according to claim 7, wherein
in a case where the threshold is Th, the target front-rear velocity is vt1, and the target angular velocity is ωt, the control device performs correction by replacing the target front-rear velocity with a front-rear velocity correction value vt1' that satisfies Formula (1) below and replacing the target angular velocity with an angular velocity correction value of that satisfies Formula (2) below:

$$\begin{cases} vt1' = vt1\sqrt{\dfrac{Th}{vt1 \times \omega t}} & (1) \\ \omega t' = \omega t\sqrt{\dfrac{Th}{vt1 \times \omega t}} & (2) \end{cases}$$

9. The truck according to claim 7, wherein
in a case where a mass of the truck is m, a distance in a vehicle front-rear direction from a center of gravity to the wheel is $L_1$, a distance in a vehicle width direction from the center of gravity to the wheel is $L_2$, a maximum static frictional force of the wheel with respect to a floor surface is $F_{max}$, and a propulsive force of each of the wheels with respect to the floor surface is F(i), i being an argument indicating a numeral of the wheel, the threshold is set to be equal to or less than a minimum value of an upper limit value τ(i) represented by Formula (3):

$$\tau(i) = 2 \times \left(\frac{L_2}{L_1}\right) \times \frac{F_{max} - F(i)}{m}. \quad (3)$$

10. The truck according to claim 7, wherein the control device performs the correction processing only when the truck moves backward.

* * * * *